United States Patent [19]
Tsukuda

[11] Patent Number: 6,085,170
[45] Date of Patent: Jul. 4, 2000

[54] DELIVERY MANAGING SYSTEM

[75] Inventor: Gunji Tsukuda, Sagamihara, Japan

[73] Assignee: Hitachi, Ltd., Tokyo, Japan

[21] Appl. No.: 08/975,227

[22] Filed: Nov. 21, 1997

[30]     Foreign Application Priority Data

Nov. 28, 1996 [JP] Japan .................................. 8-317438

[51] Int. Cl.[7] .............................................. G07B 17/00
[52] U.S. Cl. ............................... 705/26; 705/8; 705/27; 345/963; 345/961
[58] Field of Search ................... 345/963, 961; 705/26, 27, 8

[56]           References Cited

U.S. PATENT DOCUMENTS

| | | |
|---|---|---|
| 4,894,717 | 1/1990 | Komei . |
| 5,072,401 | 12/1991 | Sansone et al. .................... 364/478.07 |
| 5,223,829 | 6/1993 | Watabe . |
| 5,465,291 | 11/1995 | Barrus et al. ........................... 379/67.1 |
| 5,469,362 | 11/1995 | Hunt et al. .......................... 364/478.01 |
| 5,485,369 | 1/1996 | Nicholls et al. . |
| 5,576,951 | 11/1996 | Lockwood ................................ 705/27 |
| 5,666,493 | 9/1997 | Wojcik et al. ............................ 705/26 |
| 5,758,329 | 5/1998 | Wojcik et al. ............................ 705/28 |
| 5,794,222 | 8/1998 | Wakabayashi et al. ................. 705/404 |

FOREIGN PATENT DOCUMENTS

| | | |
|---|---|---|
| 370 146 A1 | 5/1990 | European Pat. Off. . |
| 683 483 A2 | 11/1995 | European Pat. Off. . |
| 2-101572 | 4/1990 | Japan . |
| 5-165847 | 7/1993 | Japan . |
| 6-270992 | 9/1994 | Japan . |
| 8-287158 | 11/1996 | Japan . |

OTHER PUBLICATIONS

Morash, On the Use of Transportation Strategies to Promote Demand., Logistics and Transportation Review, Vol. 26, p. 53(23) Mar. 1990.

Garboden, Think Before You Ship: The Many Choices for Package Delivery, Office Systems, vol. 8, No. 6, pp. 48–52, Jun. 1991.

Trunick et al., Logistics Excellence Is Its Own Reward, Transportation and Distribution, vol. 33, No. 9, pp. 45–54, Sep. 1992.

Voorhees, Sorting Out the 3rd–Party Circus., American Shipper, vol. 34, No. 10, p. 61(9), Oct. 1992.

*Primary Examiner*—Allen R. MacDonald
*Assistant Examiner*—Jagdish Patel
*Attorney, Agent, or Firm*—Beall Law Offices

[57]           ABSTRACT

A delivery managing system for managing delivery of goods from a distribution center through an agent to a receiver is disclosed. A client provides at least schedule information of the receiver. A distribution server provides at least delivery schedule information and manages delivery of the goods. An agent server manages the commission on the goods by the agent. A data transmission network interconnects the client, the agent server and the distribution server. A means for determining the date and time for delivery of the delivery goods is provided, as well as for deciding the agent to be used, between said client and said distribution server. Also, a means for notifying of arrival and/or departure of the goods to and/or from the agent to at least one of the distribution server and said client is disclosed.

16 Claims, 15 Drawing Sheets

| AREA NAME | STARTING DATE AND TIME FOR DELIVERY | COMPLETION DATE AND TIME FOR DELIVERY | |
|---|---|---|---|
| Utsukushigaoka | 960924 (16) | 960924 (18) | 301 |
| Utsukushigaoka | 960925 (16) | 960925 (18) | 302 |
| Azamino | 960924 (10) | 960924 (12) | |
| | | | |

| CONTRACT CODE | RECEIVER ADDRESS | DELIVERY GOODS | ARRIVAL DATE OF DELIVERY GOODS | SCHEDULED DATE FOR DELIVERY | ELECTRONIC ADDRESS OF RECEIVER | CONDITION OF DELIVERY |
|---|---|---|---|---|---|---|
| 1001 | Utsukushigaoka Nishi 2-4-1 | CLOCK | 960922 (15) | | tsukuda@aaa.bbb | |
| 1205 | Utsukushigaoka Higashi 3-2-10 | PC | 960923 (15) | 960924 (16) | yamada@aaa.ccc | |
| 7281 | Azamino Minami 4-4 | BAG | 960923 (15) | X AGENT | eguchi@aaa.ccc | AGNET |
| | | | | | | |
| | | | | | | |

| STARTING DATE / TIME | COMPLETING DATE / TIME | PLACE | CONTENTS |
|---|---|---|---|
| 960924 (9) | 960924 (18) | Kashimada | BUSINESS |
| 960925 (11) | 960925 (14) | Shibuya | WEDDING PARTY OF FRIEND |
| 960925 (16) | 960925 (18) | Own House | RECEIPT OF DELIVERY |
| | | | |

FIG. 7

| CONTRACT CODE | PURCHASED GOODS | STANDARD FOR USE OF AGENCY | AGENT TO BE USED | SCHEDULED DATE FOR DELIVERY | PLACE OF STORAGE |
|---|---|---|---|---|---|
| 1001 | CLOCK | 5 DAYS PASSED | X AGENT | 960925 (16) | A DISTRIBUTOR |
| 2529 | BOOK | 3 DAYS PASSED | X AGENT | | X AGENT |
| 3795 | VERSE | NOT USED | | | |
| | | | | | |

FIG. 9

| CONTRACT CODE | PURCHASED GOODS | DAY OF STORE-IN | DAY OF STORE-OUT | ELECTRONIC ADDRESS OF DISTRIBUTOR | ELECTRONIC ADDRESS OF PURCHASER |
|---|---|---|---|---|---|
| 2529 | BOOK | 960916 | | info@a-butu.co | tsukuda@aaa.bbb |
| 4293 | CLOTHES | 960924 | | info@a-butu.co | yamada@aaa.ccc |
| 7281 | BAG | 960914 | 960919 | info@a-butu.co | |
| | | | | | |

125

901

| CONTRACT CODE | SIZE (S) | NECESSITY OF REFRIGERATION |
|---|---|---|
| 1001 | 10 * 10 * 10 | NOT NECESSARY |
| 1205 | 50 * 50 * 30 | NOT NECESSARY |
| 7281 | 30 * 30 * 30 | NOT NECESSARY |
| | | |

FIG. 15

| BOX NUMBER | SIZE (S) | IS REFRIGERATION POSSIBLE ? | CONTRACT CODE |
|---|---|---|---|
| 1 | 30 * 40 * 10 | IMPOSSIBLE | |
| 2 | 50 * 50 * 50 | IMPOSSIBLE | |
| 3 | 30 * 30 * 30 | POSSIBLE | 4293 |
| | | | |

| ELECTRONIC ADDRESS FOR RESPECTIVE DISTRIBUTORS |
|---|
| info@a - butu. co |
| xxx@b - butu. co |
| yyy@buturyuu -ccc. co |
|  |

DELIVERY MANAGING SYSTEM

BACKGROUND OF THE INVENTION

1. Field of the Invention

The present invention relates to a system for supporting delivery of purchased goods or commodities from a distribution center to a purchaser when purchased through an on-line shopping service and/or a mail order system, or the like.

2. Description of Prior Art

With the widespread use an on-line shopping service through the Internet etc., demand for delivery services is expected to increase more than ever before. On the other hand, because of increase in the average age of marriage, as well as in the number of families in which both parents work at jobs, the possibility that the purchaser is absent from home when the delivery service visits at her/his house is increased. This causes a problem that the distributor must deliver it again, thereby increasing the cost of delivery service. Also, it causes another problem for the purchaser that she/he cannot easily or quickly receive the commodities or goods that she/he bought. Therefore, for both the distributor and the purchasers, it is very important object to realize and to establish a smooth delivery system of the purchased commodities or goods, at the present as well as in the future.

For resolving such problems, there was already known a technology with which the delivery of the commodities or goods can be done even in an instance of absence of family members at home. For example, in accordance with a conventional technology, a delivery box is provided for each family at the entrance of the house thereof, and only the distributor is informed of an identification number or code of the delivery box thereby prohibiting or protecting the box from being opened by the persons other than the distributor so as to maintain the security thereof (Japanese Patent Laying-Open No. Hei 02-1051572). Or, there was also known a technique in which, in a common place of a condominium is provided a delivery locker for common use, in which a plurality boxes are provided, thereby enabling the delivery of commodities or goods to be delivered for each room of the condominium (Japanese Patent Laying-Open No. Hei 06-270992). However, hereinafter, a block for storing or receiving a single commodities or goods therein is called "a box", and a structure having one or more of such boxes is called "a delivery locker" as a whole.

As an another means for dissolving the problem mentioned above, there was also known a method, in which the distributor automatically registers data about date and time when the resident of address to be delivered wishes to receive the goods into a data base thereof through push buttons when receiving an information through a telephone from the resident on the desired date and time for delivery service. And, using this data, the chance of delivering to the residence in absence can be reduced (Japanese Patent Laying-Open No. Hei 05-165847). In accordance with this method, it is further described that the tendency of the resident(s) to stay at home on day and time can be detected by storing the data about date and time when the resident(s) of that address wishes to receive, therefore, even if there is no information from the receiver or addressee in a certain case of delivery of the goods, the chances of delivering at the residence in absence can be reduced by using that tendency.

SUMMARY OF THE INVENTION

As is apparent from the above, it is possible to achieve home delivery service of commodities or goods even in absence of the purchaser by using the delivery box of the conventional technology. However, it is still difficult to provide such a delivery box in front of every house and such the common delivery locker in the common place for every condominium, from a view point of spaces.

Further, if being provided such the common delivery locker in the common place of the condominium, there is still a problem in the conventional technology mentioned above, i.e., of forgetting to receive the delivered commodities. For the distributor side, since it is impossible to check whether the delivered commodities which is received in the delivery box is taken out therefrom or not, it is also impossible to make a confirmation of receipt by the resident of the addressee. In other words, it is still impossible to follow up the receipt by the resident of the address of the delivery goods.

Further, in the method for reducing the chance of delivery to the absent residence by using the information of desired date and time for the delivery service in accordance with the conventional art, it is necessary for the resident of the address to know that there is commodities or goods to be delivered to her/him. For this reason, the distributor must previously notify the resident of the address that there are commodities or goods to be delivered to her/him, by using such as a telephone call or a card for absentee. This also comes to be a considerable burden for the distributor. Further, the tendency detected from the stored data of the desired date and time for delivery can only indicate that the resident stays at home accidentally on a certain date and time of a day of a week, only up to that time. Therefore, even in the case that it is delivered on the detected date and time of high possibility for the resident to stay at home, the possibility of absence is still high, and there is still remained a lot of possibility that the purchased commodities could be delivered earlier than that detected date and time.

Thereby, an object of the present invention is, for overcoming the problems in the prior art mentioned above, to provide a smooth delivery system from the distributor to the purchaser of the commodities or goods which is purchased through the on-line shopping service and so on.

For accomplishing the object mentioned above, in accordance with the present invention, there is provided means for determining scheduled date and time for delivery of the purchased commodities or goods, from a schedule information of a delivery information of each area of the distributor and a schedule information of the purchaser.

Further, there is provided means for determining that the delivery of the commodities or goods is to be conducted through an agent, on a basis of an information of a standard for using an agency, in relation with the commodities or goods to be delivered.

Further, in case that the commodities or goods is decided to be delivered from the distributor to the purchaser through an agency, there is provided means for detecting the commodities or goods that has been kept in the agent in long time.

BRIEF DESCRIPTION OF THE DRAWINGS

FIG. 4 shows an example of a delivery goods information used in the above delivery managing system;

FIG. 7 shows an example of a purchased goods information used in the above delivery managing system;

FIG. 9 shows an example of a commissioned goods information used in the above delivery managing system;

FIG. 15 shows an example of a locker information used in the second embodiment mentioned above;

FIG. 17 shows an example of an information list of distributors in the delivery managing system of the second embodiment;

DETAILED DESCRIPTION OF PREFERRED EMBODIMENTS

Hereinafter, embodiments according to the present invention will be fully explained by referring to the attached drawings.

Figure 1:
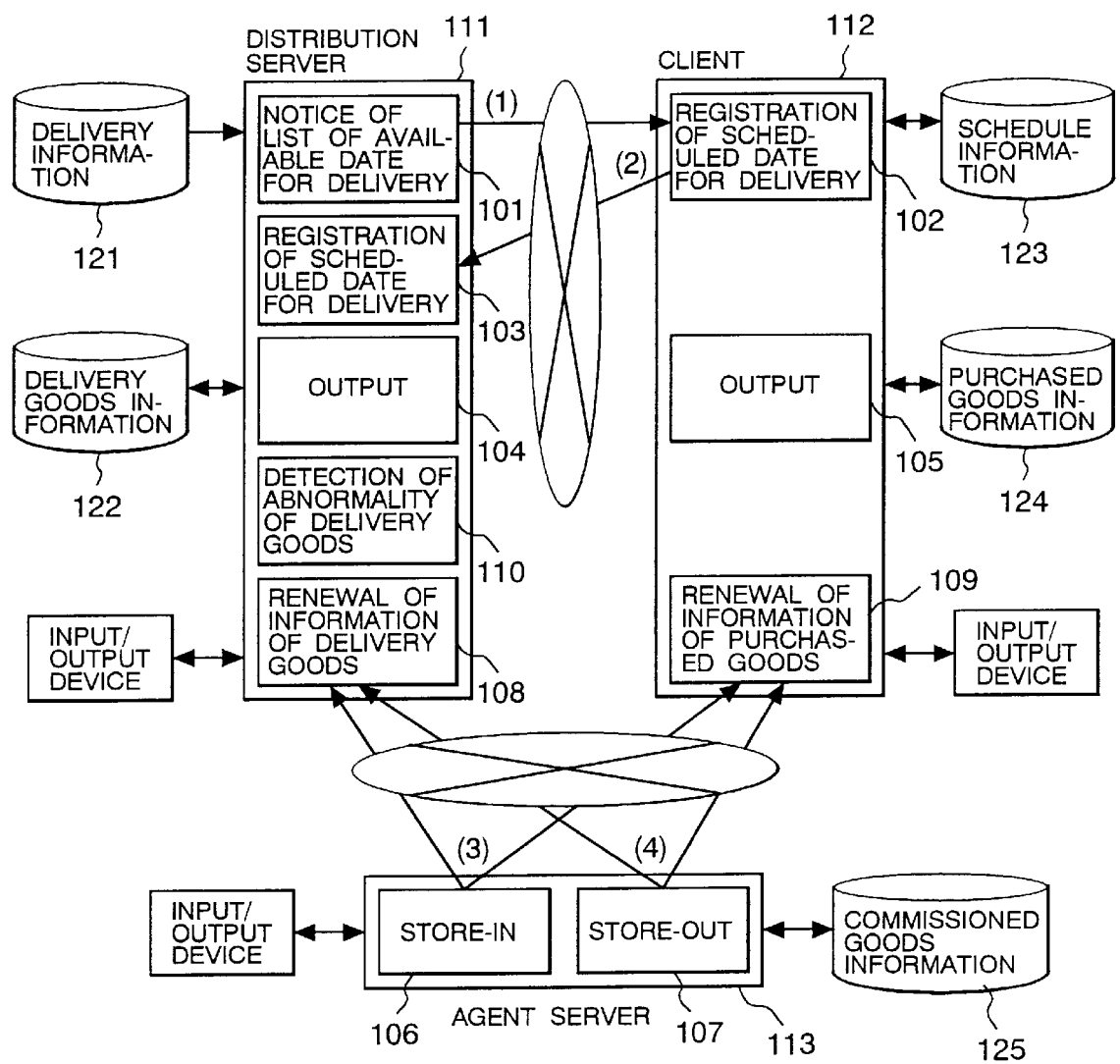
FIG. 1 shows a functional construction diagram of a delivery managing system in accordance with a first embodiment of the present invention.

FIG. 1 shows a functional construction diagram of a first embodiment of the present invention. In the present embodiment, there are provided a client and two (2) kinds of servers, including a distribution server and an agent server, and the client and the each server of those two servers is connected with an information transmission network, such as a telephone cable. However, those two (2) kinds of servers are respectively located in a plurality number thereof. In FIG. 1, a reference numeral 111 indicates an assembly of functions on the distribution server, 112 an assembly of functions on the client, and 113 an assembly of functions on the agent server. Reference numerals (1) through (4) attached to arrows in FIG. 1 indicate rough sequential order of procedures. In the embodiment of the present invention, the delivery of commodities or goods from a distributor to a receiver or an addressee is carried out after establishing a contract between the seller and the purchaser, in case of an online shopping. However, taking a case of gifts into consideration, the receiver or addressee who is primarily to be a client is not necessarily to be the purchaser.

The commodities or goods on which the contract was made, in the embodiment, is called by three kinds of names, for example, "a delivery goods", "a commissioned goods", and "a purchased goods". This is because of differences from various view points, such as from a view point of the distributor, a view point of the agent, and a view point of the purchaser. However, when calling by names of "delivery goods information" r "commissioned goods information" and "purchased goods information", they differ from one another in the contents of the information to be used for management in respective standing points, therefore they mean differently. Such a "Contract code", which is a basic information for the delivery goods information 122 and the purchased goods information 124, and a "name of goods" is an information which was produced when the contract was made, therefore they are treated as if they have been already existing in the present embodiment. However, if the purchaser differs from the receiver, there is no purchased goods information for the client as the receiver or addressee. In the delivery goods information 122, purchased goods information 124 and the commissioned goods information 125, the same "contract code" means that the same goods is treated. In the present embodiment, the "contract code" is expressed by four (4) digits of numeral number. However, in the sense of practical matter, since each "contract code" must be unique from a whole of the contracts, it may be in a form which includes a name of the seller and so on therein.

Figures 2, 3:
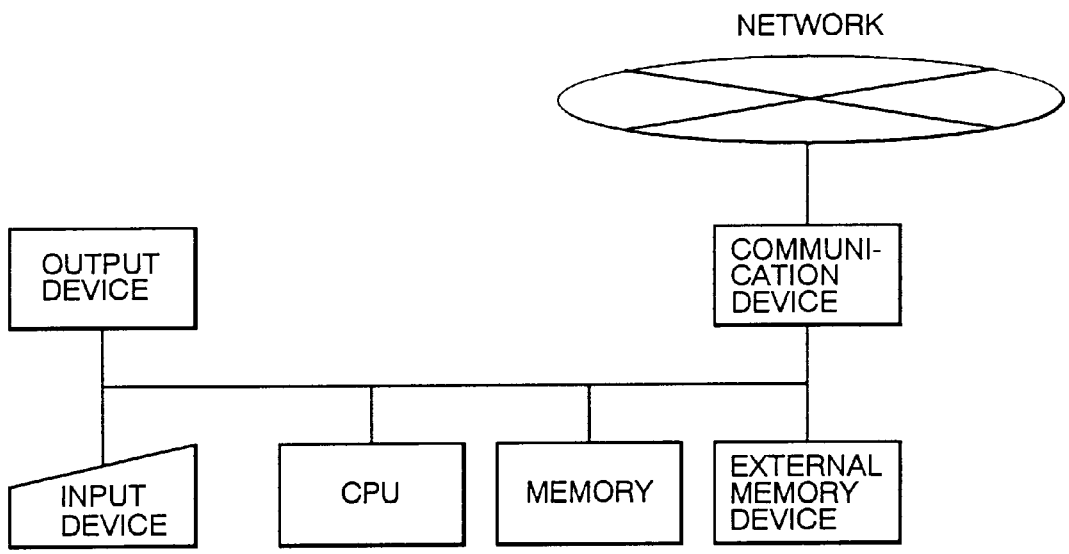
FIG. 2 shows a hardware construction of each server of the above delivery managing system.
FIG. 3 shows an example of a delivery information used in the above delivery managing system.

FIG. 2 shows a hardware construction of each server. As an input apparatus, there are included a bar-code reader, an IC-card reader and so on other than a keyboard and a mouse. As an output apparatus, there are included a bar-code writer, an IC-card writer and so on other than a display and a printer.

Hereinafter, detail of the first embodiment will be explained with FIG. 1.

A step 101 is a step for notifying the personal information server of a list of a schedule for delivery by using the delivery information 121 and delivery goods information 122.

An example of the delivery information 121 is shown in FIG. 3 and an example of the delivery goods information 122 in FIG. 4. In case that a column 411 of the delivery schedule is blanked, it means that there is not yet determined the delivery schedule and the agent. If it is filled with numerals, it means scheduled date and time, and if it is filled with letters, it means the agent to be used. In case that the column 412 of delivery condition is blanked, it means that the delivery goods is located in the distribution center. If it is filled with numerals, it means the date and time of completion of the delivery, and if it is filled with letters, it means that it is located in the agent. In a column 413 of delivery goods arrival date, there is contained a scheduled date of arrival to the distribution center which is transmitted through the communication network, or a date when the goods is actually carried into the distribution center. Compilation of the delivery information is necessary as a function on the distribution server. However, in the present embodiment, the delivery information is treated as if it has been already existing, therefore no explanation will be given on the compilation function of the delivery information. The "contract code", "delivery address", "delivery goods" and "electronic address for delivery" of the delivery goods information are information which were produced when the seller and the purchaser made the contract, and they are noticed or inputted from the seller.

Figures 5, 6:
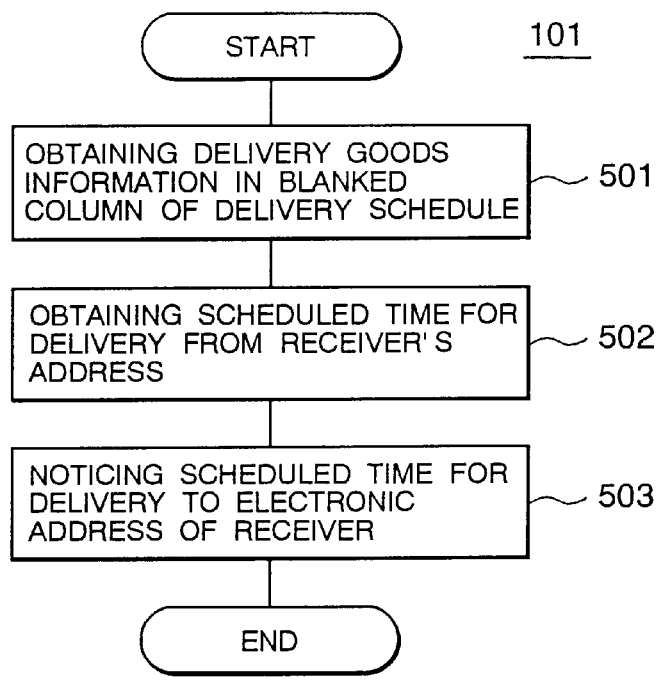
FIG. 5 shows a detailed processing flow of a step of noticing of a list of available date for delivery in the above delivery managing system.
FIG. 6 shows an example of a schedule information used in the above delivery managing system.

The detailed flow of the step 101 will be shown in FIG. 5.

In a step 501, the delivery goods information is obtained, in which a column of scheduled date for delivery is blanked. For example, such a delivery goods information 401 as shown in FIG. 4 is obtained.

In a step 502, a list of the scheduled date and time for delivery to the delivery address is obtained from the delivery addresses of the delivery goods information obtained and the delivery information 121. For example, the delivery address of the delivery goods information 401 is "Utsukushigaoka" in FIG. 4, then the data 301 and 302 are obtained that indicate date and time of starting and completing of delivery service in the area "Utsukushigaoka" as shown in FIG. 3.

In a step 503, the scheduled delivery date and time obtained in the step 502 and the contract code of the delivery goods are noticed to the electronic address for the delivery in the delivery goods information 122. For example, in the case of the delivery goods corresponding to the information 401 in FIG. 4, the contract code "1001" and the date and time of starting/completing of delivery 301 and 302 in FIG. 3 are noticed to the electronic address "tsukuda@aaa.bbb". In case that the purchaser is different from the receiver, not only the information of the contract code but also an information about the delivery goods is transmitted thereto.

A step 102 is a step in which the schedule of date and time for delivery is determined from the list of the scheduled date and time for delivery which is received from the distribution server, the schedule information 123 and the purchased goods information 124, and the determined schedule of date and time for delivery is notified to the distribution server functioning as a source of notifying thereof.

An example of the schedule information 123 and that of the purchased goods information 124 are shown in FIGS. 6 and 7, respectively. A storage 703 in FIG. 7 indicates a place where the purchased goods is kept in it. In the present embodiment, the schedule information 123 is treated as if it has been already existing. Although the compiling function of the schedule information is necessary as an function on the client, it is out of the scope of the present invention. The "contract code" and the "purchased goods" of the purchased goods information are information which were produced when the seller and the purchaser made the contract, and "a standard for using an agency" and "an agent to be used" are the information which were set after the purchaser bought and made the contract.

Figure 8:
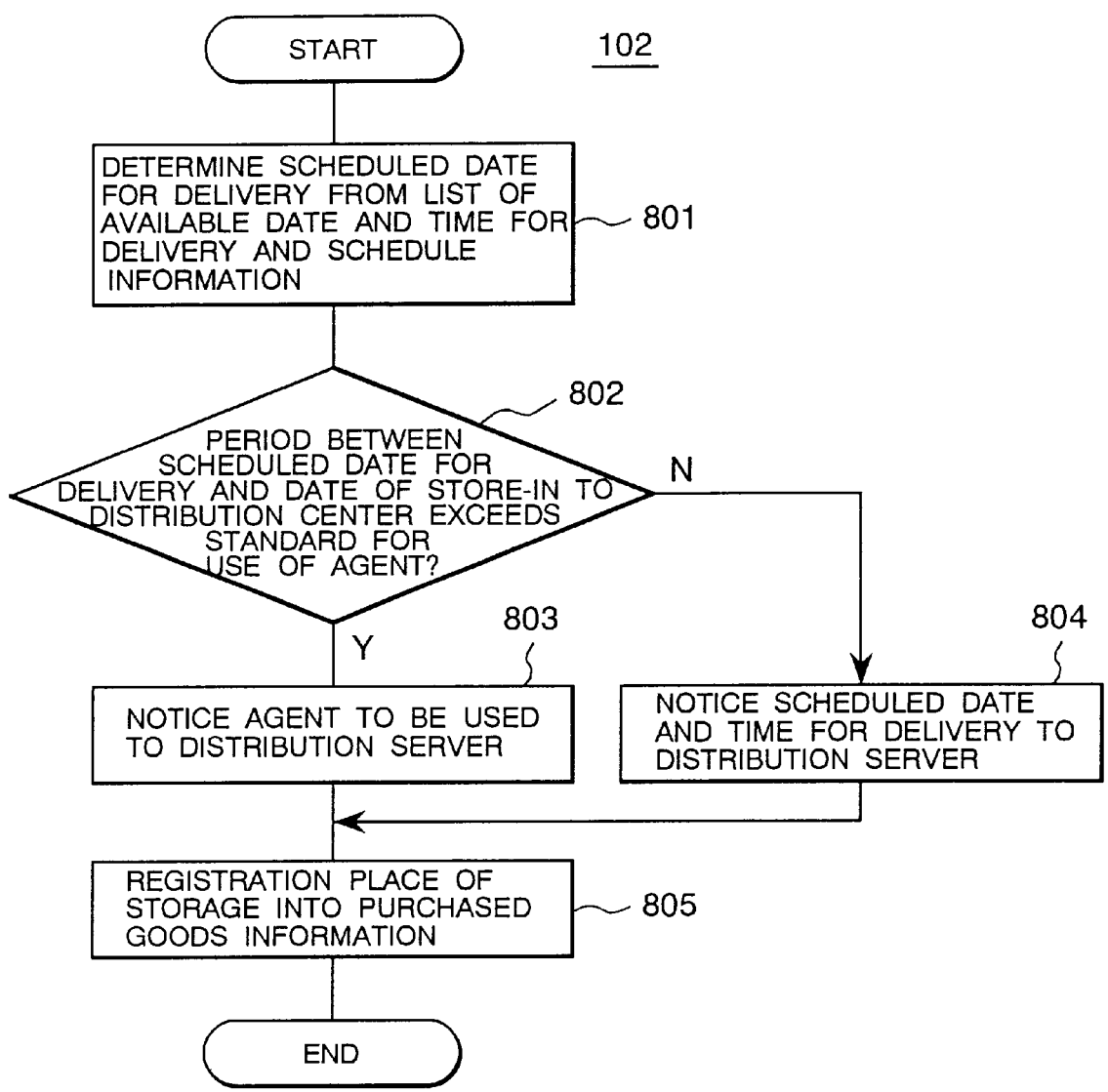
FIG. 8 shows a detailed processing flow of a step of registering a scheduled date for delivery in the above delivery managing system.

The detailed flow of the step 102 mentioned above will be shown in FIG. 8.

A step 801 is a step of obtaining the earliest one of the scheduled date and time for delivery from a list of the scheduled date and time for delivery and the schedule information. For example, since delivery service with the starting/completing date and time for delivery 301 shown in FIG. 3 is impossible judging from the schedule information 601 shown in FIG. 6, and since there is no schedule during the period of 302, then the latter, i.e., the date and time of 302 in FIG. 3 is determined to be the scheduled date and time for delivery (here, it is assumed that there is not yet existing the schedule information 602 in this time point) Actually, for determining as the scheduled time for delivery, it must be confirmed that the starting time of the scheduled delivery is later than the time of the completion time of the schedule just before as well as taking the time for moving into the consideration. Further, there is necessity of confirming the relationship to the schedule of just after it, in the same manner. If there is no schedule information, then it is treated as if there is not any schedule therein.

In a step 802, there is determined whether the goods should be delivered to the agent or to the delivery address. If the time interval between the day when it reaches at the distribution center and the available earliest scheduled date is greater than the days defined in the standard for using agency 701 shown in FIG. 7, it is decided to use the agent, and then a step 803 is executed. If it is not so, then a step 804 is executed. For example, in the case of the delivery goods information 401 shown in FIG. 4, since the standard for using an agency of the purchased goods information 705 of the contract code "1001" in FIG. 7 is "5 days", and since the interval between the date of arriving at distribution center 402 "960922(15)" and the earliest scheduled date for delivery "960925(15)" does not exceed that 5 days, it is decided to be delivered to the delivery address. In case that "no use" is described in the column of the standard for using agency 701 in FIG. 7, the number of the days of the standard is considered limitless. As other standards for using agency other than that, there are cases of "impossible to deliver until ○th month, xth day", "impossible to deliver after Δ days have been passed from the date of purchasing contract", "absent when delivered once", and so on. Further, with the delivered goods on which the standard for using agency is not described, it can be considered that a default standard is used for it. With this, even when the purchaser of the goods is different from the receiver (a client), it is possible to use the agency.

In a step 803, the agent to be used is notified to the distribution server as the source of the list of the scheduled date and time for delivery. For example, in case of the goods of the contract code "1001" in FIG. 7, "agent X" in the column 701 is notified to the distribution server from the purchased goods information 705.

In an arbitrary agent, the commission is not necessarily available for all of goods. For example, it cannot deal with if the goods is larger than a certain size(s), or if there is no room for storing the goods to be commissioned. For that reason, a plurality of agents may be notified to the distribution server.

In a step 804, as well as the earliest one of the scheduled date and time for delivery is notified to the distribution server as the noticing source of the list of the scheduled date and time for delivery, the scheduled date and time for delivery is registered into the schedule information 123 and the purchased goods information 124. For example, as an schedule information relating to the contract code "1001", "starting date and time: 960925(16), completing date and time: 960925(18), place: home, contents: receiving of delivery goods" (602 in FIG. 6) is registered into the schedule information 123, and "960925(16)" is registered into 704, as shown in FIG. 7.

In a step 805, the distribution server as the noticing source of the list of the scheduled date and time for delivery is registered into a storage 703 shown in FIG. 7 of the purchased goods information 124 as the storage at the present.

A step 103 shown in FIG. 1 is a step in which the scheduled date and time for delivery from the client, or the agent to be used is registered into the delivery goods information 122. For example, the scheduled date "960925 (6)" 704 in FIG. 7, which is notified in relation with the contract code "1001" is registered into a column 403 in FIG. 4. At this time, also an information of the delivery goods is notified to the agent to be used, as the case may be. When receiving a response that the agent cannot deal with, then the notice is made to another agent. If all the agents is unavailable, it is notified to the client. Further, if a plurality of agents were notified, only the agent which is decided to be used is notified to the client.

In case that the delivery of delivery goods is conducted by the agent, the delivery goods itself is transferred from the distribution center to the agent. In this time, an information relating to the delivery goods is inputted on a paper or into a IC-card as a conveyable memory medium which can be attached therewith, by using the input apparatus including the bar-code reader, the IC-cord reader and so on. If the information of the delivery goods was already noticed to the agent server through the communication network, a confirmation of the purchased goods will be done by comparing the purchased goods information through the network and that inputted through the input apparatus.

In a step 104 in FIG. 1, the information of the delivery goods to be transferred to the agent is outputted as a line of letters or in a form of the bar-code on the paper, or outputted into the IC-card as the conveyable medium. The information to be outputted includes the electronic address of the distributor.

In the step 105 in FIG. 1, in order to receive the purchased goods which is completed to be delivered to the agent, the information of the purchased goods is also outputted as a line of letters or in a form of the barcode on the paper, or outputted into the IC-card as the conveyable medium.

A step 106 in FIG. 1 is a step, in which the purchased goods information inputted from the input apparatus is registered into the agent information 125 shown in FIG. 9, and a notification of arrival of the goods into the store is given to the distribution server and the client relating to it. For inputting, the bar-code or the card which are produced in the step 104 can be used. In this time, the delivery of the goods from the distributor to the agent is done.

The detailed processing flow of the step 106 will be given with reference to FIG. 10.

Figure 10:
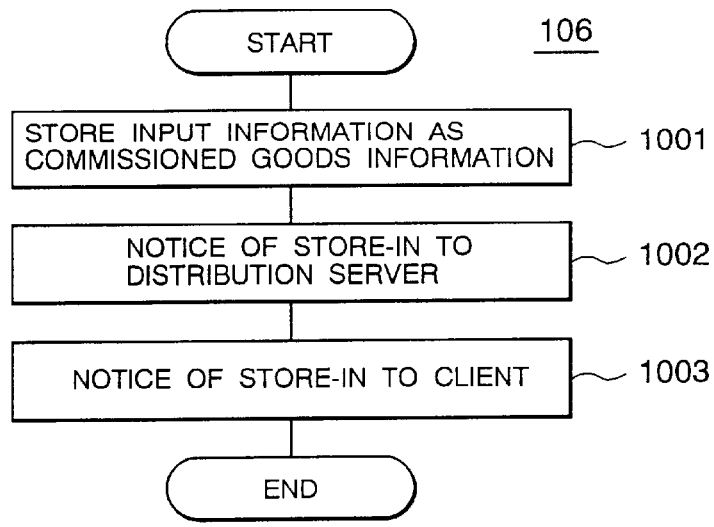
FIG. 10 shows a detailed processing flow of a step of an arrival of an agent server in the above delivery managing system.

In a step 1001 in FIG. 10, the information inputted from the input apparatus is registered into the commissioned goods information 125. For example, in case that the information inputted from the input apparatus is "contract code: 2529, purchased goods: book, electronic address of distributor: info@a-butu.co, electronic address of purchaser: tsukuda@aaa.bbb" as shown in FIG. 9, the day when those information are inputted is treated as the day of arrival so as to set the commissioned goods information 901.

In a step 1002, the arrival of the delivery goods into the agent is notified to the distribution server. For example, in the case of the commissioned goods information 901 shown in FIG. 9, the identification number "2529" and a flag of the arrival are notified to the address "info@a-butu.co" of the distributor.

In a step 1003, the fact that the delivery goods has arrived to the agent is notified to the client, in the same manner as in the step 1002 mentioned in the above.

A step 107 in FIG. 1 is a step, in which the date of departure of the goods is registered into the commissioned goods information 125 by using the contract code of the commissioned goods, which is inputted from the input apparatus, and the departure of the goods is notified to the distribution server and the client relating thereto. For inputting, the bar-code or the IC-card as the conveyable medium which are produced in the step 105 can be used. In this time, the delivery from the agent to the purchaser is done.

Figure 11:
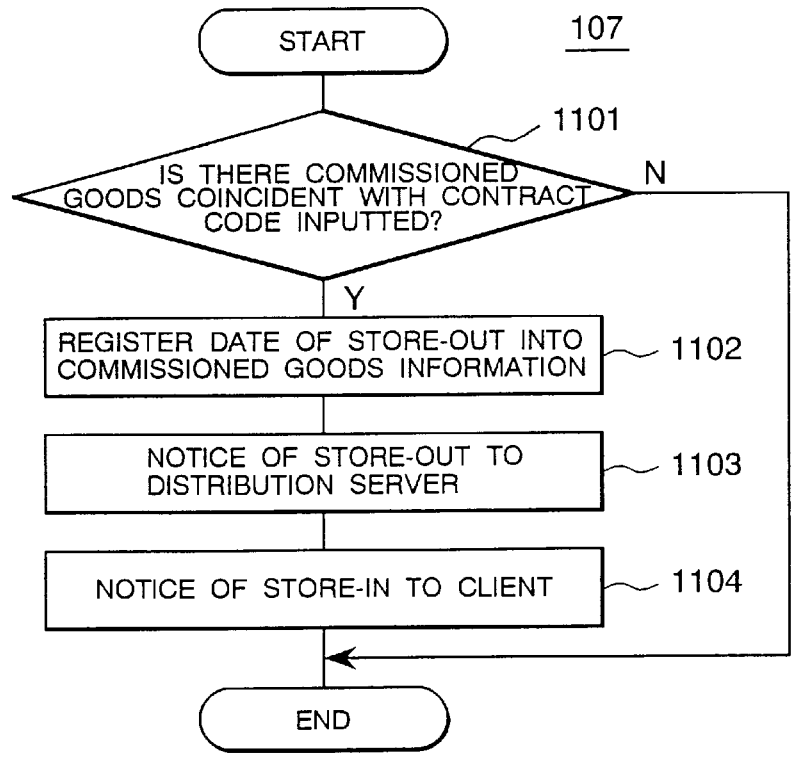
FIG. 11 shows detailed processing flow of a step of a departure of the agent server in the above delivery managing system.

The detailed processing flow of the step 107 will be given with reference to FIG. 11.

A step 1101 is a step, in which it is decided or checked whether there is any agent coincident with that being identified in the contract code which is inputted from the input apparatus.

A step 1102 is a step, in which the date when the contract code is inputted from the input apparatus is registered into the column of the date of departure of the commissioned goods information relating to the contracting code. For example, in case that the contract code "2529" is inputted, a date is set in the column of the departure of the commissioned goods information 901, as is shown in FIG. 9.

In a step 1103, the fact that the delivery goods is put out or departure from the storage of the agent is noticed to the distribution server from the agent. For example, in the case of the commissioned goods information 901 shown in FIG. 9, the identification number "2529" of the delivery goods and the departure flag is noticed to the address of the distributor, i.e., "info@a-butu.co".

In a step 1104, in the same manner as in the step 1103, the fact that the delivery goods is put out or has departed from the storage of the agent is noticed to the client.

A step 108 is a step, in which the delivery goods information is renewed on the basis of the information noticed from the agent server. In case that the information noticed from the agent server includes the contract code and the arrival flag, "agent" is registered into a column of delivery condition of the delivery goods information 122 which relates to the contract code. In the other case that the information noticed from the agent server includes the contract code and the departure flag, the date of the departure is registered into the column of the delivery condition of the delivery goods information which relates to the contract code. In more detail, in the step 108, in case that the information of completion of delivery of the goods which is directly delivered to the address is inputted, the date and time of the delivery is also registered into the column of the "delivery condition" of the delivery goods information 122 shown in FIG. 4.

A step 109 is a step, in which the purchased goods information 124 is renewed on the basis of the information noticed from the agent server. In case that the information noticed from the agent server includes the contract code and the arrival flag, the name of the agent is registered into a column of the "storage" of the purchased goods information 124 which relates to the contract code. In the other case that the information noticed from the agent server includes the contract code and the departure flag, as shown in FIG. 7, the date of the departure is registered into the column of the "storage" of the delivery goods information 124 which relates to the contract code.

A step 110 is a step for detecting an abnormal condition of the delivery goods. For example, it detects such the delivery goods located in the agent, of which the purchaser does not come to receive it although several days have already passed-by. In the present embodiment, the step 110 functions as one of those on the distribution server, however, the step 110 can be carried out on the client or the agent server other than that mentioned in the above.

Each of the distribution server 111, the client 112 and the agent server 113 comprises means for outputting the information treated with respective server. From the first embodiment, following effects can be obtained.

(1) Because the distributor can deliver the goods after confirming that the receiver or addressee stays at home, the possibility or chance to deliver it during her/his absence is reduced, thereby cutting back the delivery cost. (However, the delivery on absence cannot necessarily neglected to be zero because she/he sometimes goes out after making the confirmation.)

(2) The purchaser can receive the purchased goods at an earlier timing at her/his home, by keeping her/himself for a moment from going outside for shopping, etc., since the date and time for delivery is clear for her/him in advance.

(3) In case that the purchaser does not come back home in the delivery time of the distributor for a several days, she/he can receive the goods in an earlier timing by using the agent (However, in this case, an assumption that the agent is doing business later that the distributor is necessary).

(4) On the goods which has been kept for a several days in the agent since the purchaser forgot to receive it, a reminder can be given from the distributor or the agent to the purchaser to receive it, thereby dissolving the forgetting to receive by the purchaser in an earlier timing. Further, the purchaser can check if she/he forgets to receive the goods by her/himself, thereby she/he may go to the distributor or the agent to receive it, or change the delivery address to her/his home address.

Figure 12:
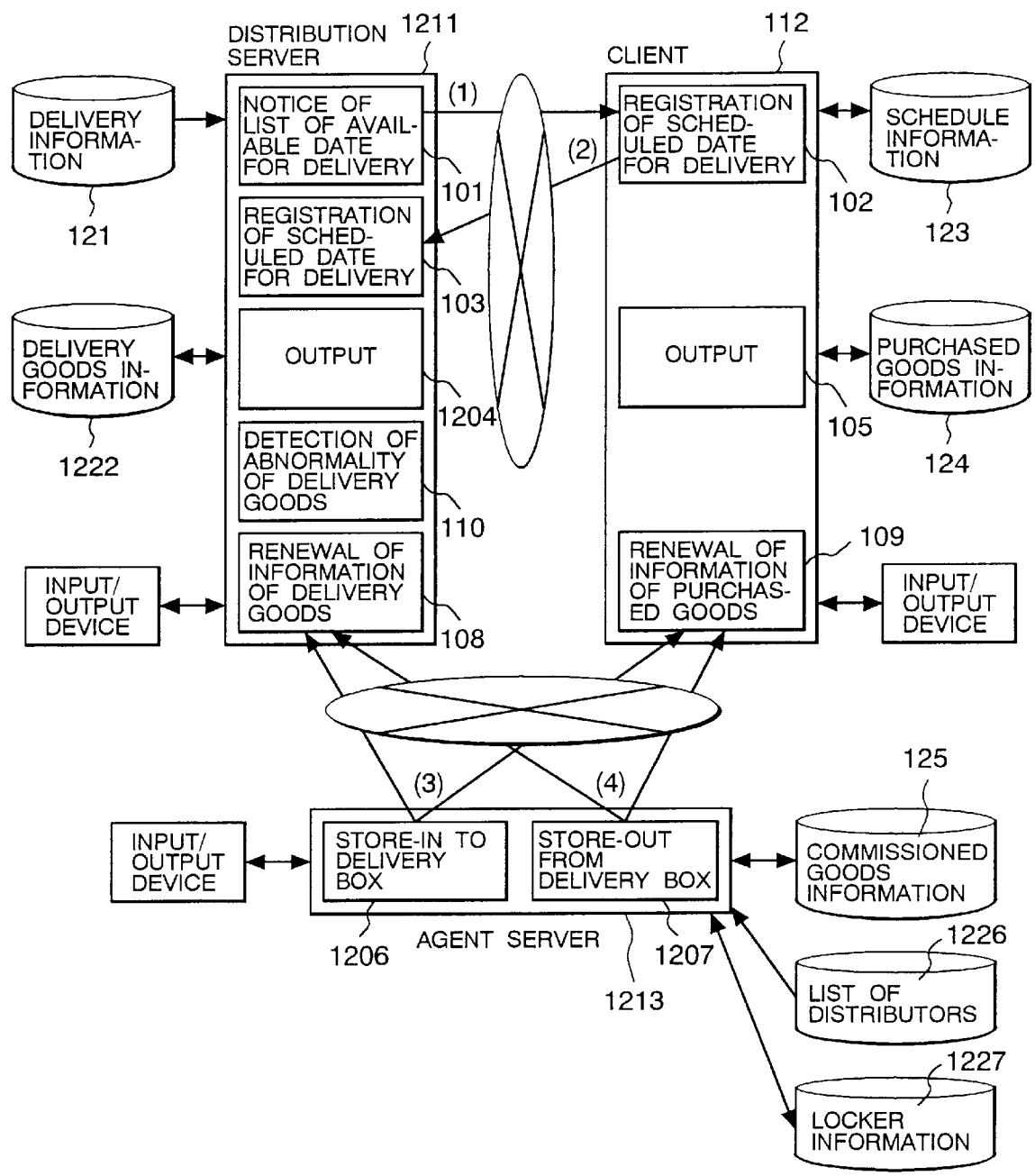
FIG. 12 shows a functional construction diagram of a delivery managing system in accordance with a second embodiment of the present invention.

FIG. 12 shows a functional construction diagram of a second embodiment of the present invention. The portions and/or elements to which the same reference numerals as the first embodiment are attached indicate the same procedures and/or information of the first embodiment. In the present embodiment, only a portion different from the first embodiment will be explained. A reference numeral 1211 indicates an assembly of the functions of the distributor servers in the second embodiment, and 1213 an assembly of the functions of the agent servers.

In the first embodiment, it is assumed that a human lies between in the delivery of goods conducted through the agent. Namely, a person who stays in the agent at any time make the confirmation of receipt of the goods from the distribution center, and she/he deliver the goods to the resident of the delivery address. In the second embodiment, for accomplishing an unmanned agent, the delivery locker is provided in the agent. The delivery locker is an assembly of boxes for conducting the delivery of goods, and is similar to a coin-operated locker or storage in the shape which is provided in a station, etc. In each of boxes, there is provided an electronic key, a box open/close device to open or release and close or lock the key thereof, and a box observation device for affirming an existence of the goods inside thereof.

Figures 13, 14:
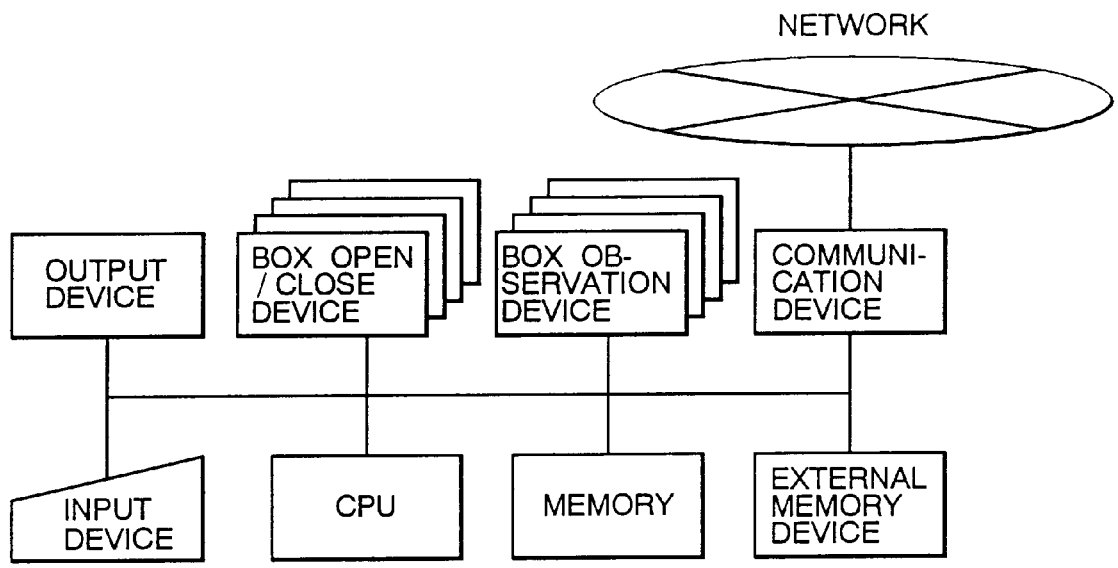
FIG. 13 shows a hardware construction of an agent server of the delivery managing system shown in FIG. 12.
FIG. 14 shows an example of the delivery goods information used in the second embodiment mentioned above.

FIG. 13 shows a hardware construction of the agent server in the second embodiment.

Hereinafter, the detailed explanation will be given with reference to FIG. 12.

In a step 1204, in addition to the information outputted in the step 104 mentioned above, a condition for storing the delivery goods in the delivery locker (i.e., size(s)or necessity of refrigeration of the goods, etc.) is outputted by using the delivery goods information 1222.

In FIG. 14, only the differences between the delivery goods information 122 already shown in FIG. 4 and the delivery goods information 1222, with respect to respective "contract code" are shown. As is apparent from this, the delivery goods information 1222 is constructed by further adding items or columns "size(s)" and "necessity of refrigeration of the goods" to the items of the delivery goods information 122 shown in FIG. 4.

A step 1206 is a step, in which the information inputted from the input apparatus is registered into the commissioned goods information 125 and a locker information 127, thereby to notice the arrival to the distribution server and the client relating thereto. For the purpose of inputting, the bar-code or the IC-card as the convayable medium which are produced in the step 1204 can be used.

An example of the locker information 1227 is shown in FIG. 15. The locker information comprises, other than "Box Number", various conditions for using the respective boxes, including "size(s)", "able to refrigerate?" and so on. Further, there is provided a "contract code" column for storing the contract code of the commissioned goods.

Figure 16:
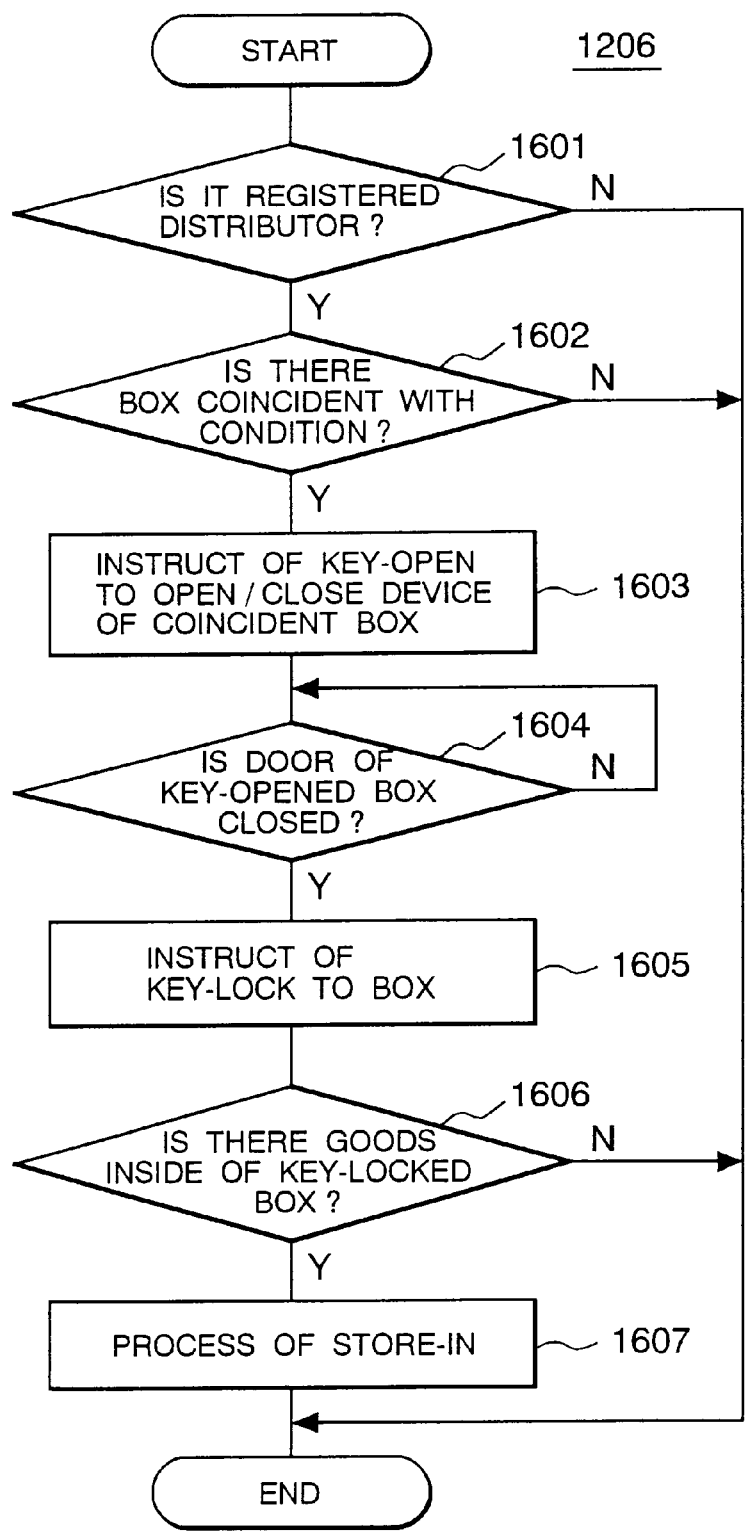
FIG. 16 shows a detailed processing flow of a step the arrival of the agent server.

The detailed processing flow of the step 1206 will be given with reference to FIG. 16.

A step 1601 is a step for checking whether the electronic address of the distributor in the inputted information is in the list of the distributors or not, by using a distributor information 1226. This step is executed for prohibiting the distributors other than those registered from their impermissible use or tricking thereof. However, if such operation is not to be intended, there is no necessity of such the procedures mentioned above. An example of the distributor information 1226 is shown in FIG. 17.

A step 1602 is a step for checking whether there is a locker which satisfies the condition or not, with respect to the delivery goods scheduled to be arrived. For example, in the case of the delivery goods of the contract number "7281", the condition for arrival is such as the reference numeral 1401 shows. Since there is a box satisfying the condition in accordance with the locker information 1501, a result of the checking is all right, i.e., OK.

A step 1603 is a step, in which an instruction to open or release the key is given to the open/close device of the box which is detected to satisfy the condition in the step 1602. After this, the distributor opens the door of the box, the key of which is opened to enter the delivery goods into it, and then closes the door thereof.

A step 1604 is the step of checking whether the door of the box, the key of which is opened, is closed or not. In case that the door is closed, a notice thereof is given from the box open/close device. A check is done depending on the presence the notice.

A step 1605 is a step, in which an instruction to close or lock the key is given to the open/close device of the box, the door of which is closed.

A step 1606 is a step for checking whether there is the goods inside of the key-locked box or not. For that checking, the box observation device such as an infrared light sensor, etc. is used. If the result of the checking is OK, the process of the store-out of the step 106 (already explained in the first embodiment) is executed.

A step 1207 is a step, in which the date of the store-out is registered into the commissioned goods information 125 and the departure is noticed to the distributor server and the client relating thereto. For the purpose of inputting, also the bar-code and/or the IC-card which are produced in the step 105 can be used.

Figure 18:
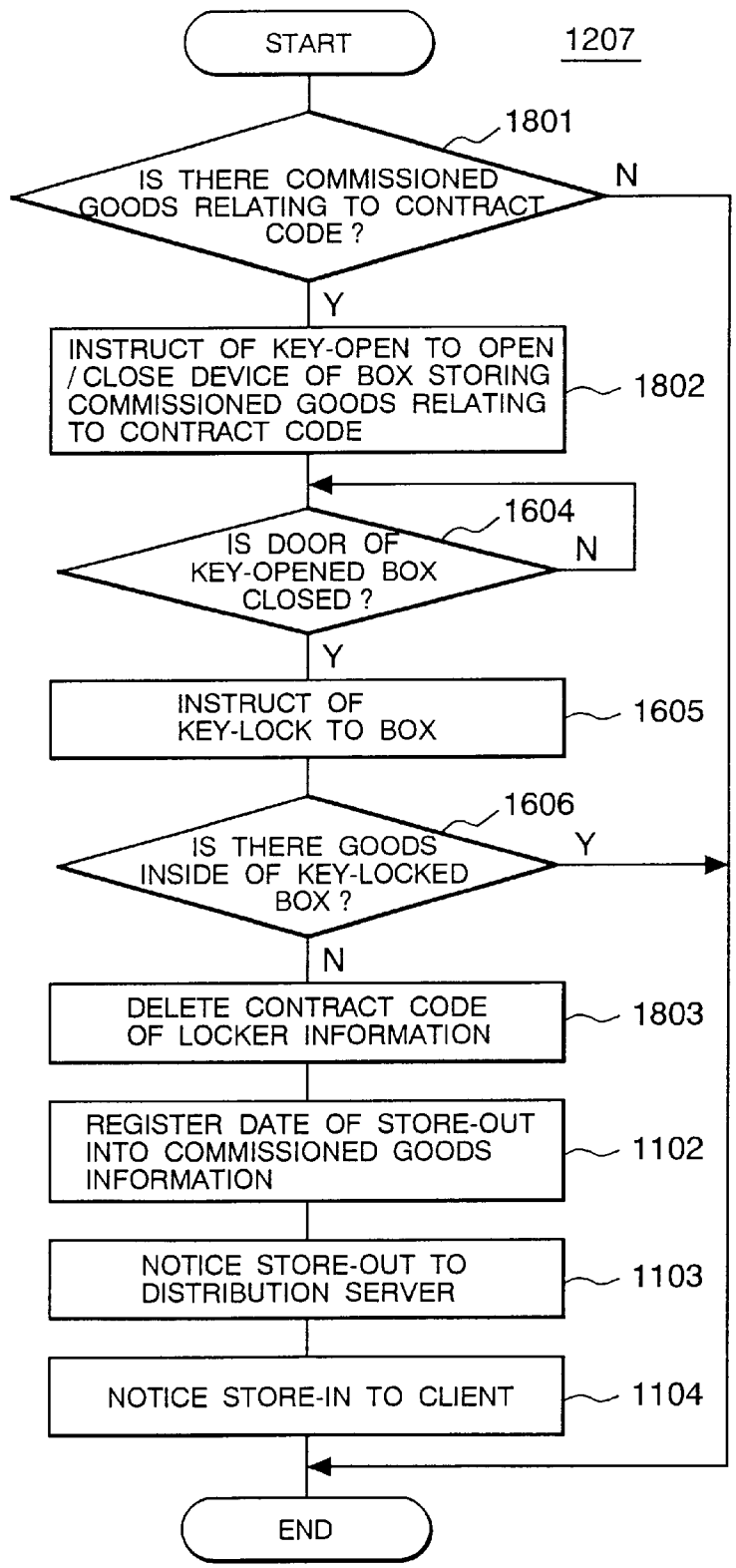
FIG. 18 shows a detailed processing flow of a step of the departure of the agent server of the delivery managing system of the second embodiment.

The detailed processing flow of a step 1207 will be given with reference to FIG. 18.

A step 1801 is a step for checking whether the commissioned goods relating to the inputted contract code is stored in the locker or not. For example, as shown in FIG. 15, in case that the inputted contract code is "4293", since it coincides with contract code of the locker information 1502, the result of the checking is to be OK.

A step 1802 is a step, in which an instruction to open or release the key is given to the open/close device of the box in which the commissioned goods relating to the contract code is stored. For example, in case that the inputted contract code is "4293", the instruction of key-opening is given to the locker open/close device having the box number "3" in the locker information 1502, as shown in FIG. 15.

After that, the purchaser opens the door of the box whose key is released to take out the purchased goods, and then closed the door. Further, steps 1604, 1605 and 1606 are executed. In case that the result of the checking in the step 1606 is no good, i.e., NG, then, a step 1803 is executed.

The step 1803 is a step, in which the "contract code" column of the locker information of the locker is deleted, from which locker the purchased goods is taken out. When the door is closed, a notice is given from the box open/close device. A checking is done depending on the presence of this notice.

In the second embodiment mentioned above, the distributor can store the delivery goods in the delivery locker and the purchaser can take out from that delivery locker. Thereby, dehumanization of the agent can be realized, and there is no time limit for the purchaser to receive it through the agent. Therefore, it is possible for the purchaser to receive the goods in an earlier timing.

Figure 19:
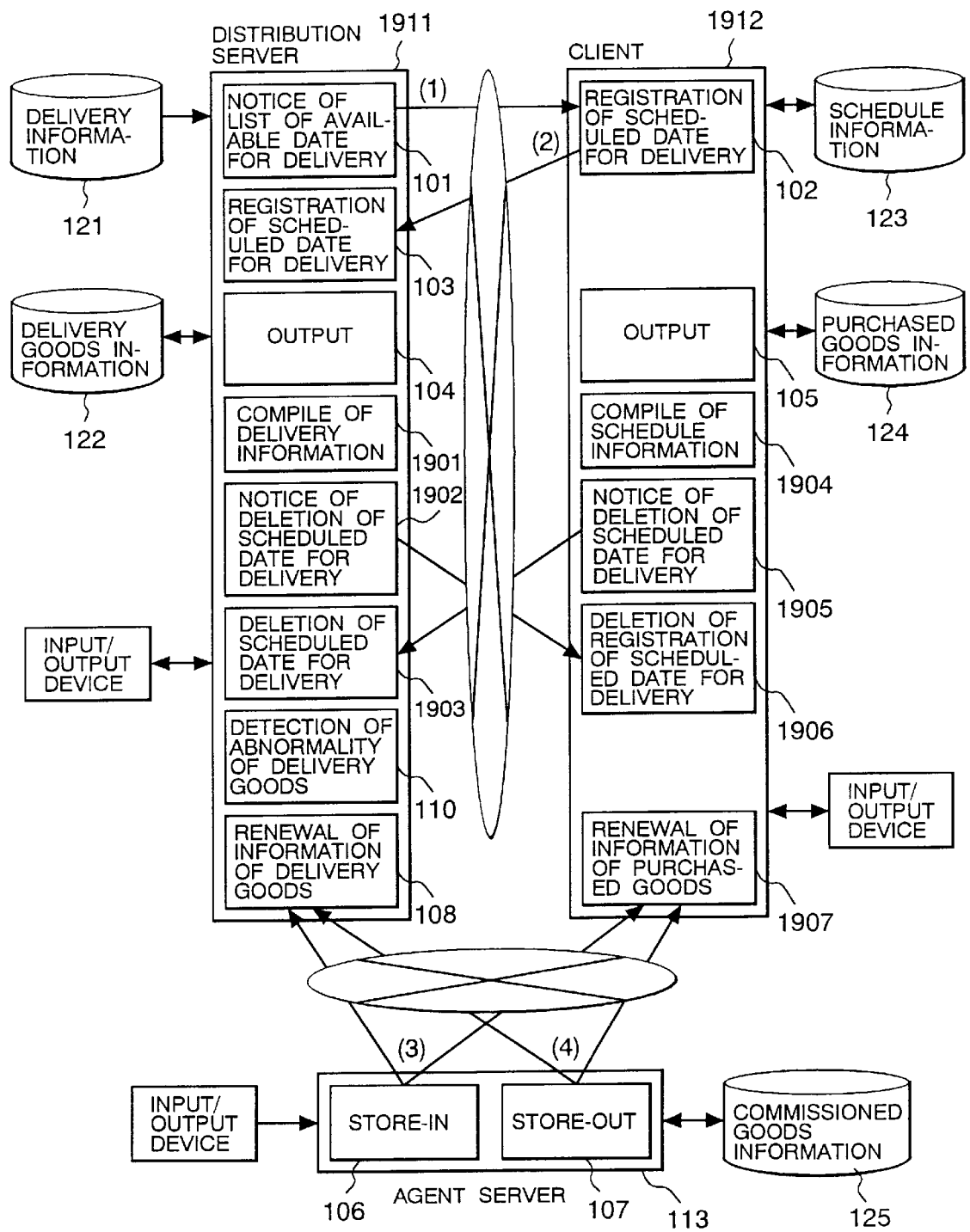
FIG. 19 shows a functional construction diagram of a delivery managing system in accordance with a third embodiment of the present invention.

FIG. 19 shows a functional construction diagram of a third embodiment of the present invention. The portions and/or elements to which the same reference numerals as the first embodiment are attached indicate the same procedures and/or information of the first embodiment. A reference numeral 1911 indicates an assembly of the functions of the distributor servers in the third embodiment, and 113 an assembly of the functions of the agent servers. In the present embodiment, only a portion different from the first embodiment is explained.

In the first embodiment, the compiling function of the delivery information 121, the delivery goods information 122, and the schedule information 123 are treated as if they are out of the scope of the present invention, therefore, an influence to other servers due to deletion of those information is not taken into consideration. In the present embodiment, however, a total managing system for delivery goods will be explained, in which the influence due to the deletion of the delivery information and the schedule information is also taken into consideration.

The detailed explanation of the third embodiment will be given by referring to FIG. 19.

A step 1901 is a step for compiling the delivery information. The compile of the delivery information can be done at an arbitrary time point. If the delivery information is deleted, a step 1902 is called up.

The step 1902 is a step in which the deletion of the scheduled date and time of delivery is noticed to the client at the address for the delivery relating to the deleted delivery information. For example, if the delivery information 301 shown in FIG. 3 is deleted, the delivery goods information 404 in FIG. 4 corresponding to the area name "Utsukushigaoka" and the delivery starting time "960925(16)" is detected, and the deletion of the scheduled date and time for delivery of the delivery goods of the contract code "1001" in FIG. 4 is noticed to the electronic address "yamada@aaa.ccc" of the delivery address of the client.

After the notice of the deletion in the step 1902, the step 101 is executed on the basis of the delivery goods information which is deleted.

In a step 1903, receiving the notice of deletion of the scheduled date and time for delivery from the client, the column of the scheduled date for delivery corresponding to the delivery goods information is made blank. For example, when receiving the notice of deletion of delivery of the contract code "1205", the column of the scheduled date for delivery of the delivery goods information 404 is blanked, as shown if FIG. 4.

After the execution of the step 1903, the step 101 is executed with respect to the delivery goods information whose column of the scheduled date for delivery is blanked.

A step 1904 is a step in which the schedule information is compiled. The compiling of the schedule information can be done at an arbitrary time point. In case that the schedule information relating to receipt of the delivery goods is deleted, a step 1905 is called up.

In the step 1905, the column of "schedule" for delivery of the purchased goods information relating to the deleted schedule of receipt of the delivery goods is blanked, and the deletion of the scheduled date and time for delivery is noticed to the related distribution server. For example, in case that the schedule 602 in FIG. 6 is deleted, the column of the scheduled date of the purchased goods information 705 in FIG. 7, which has the scheduled date for delivery coincident with the starting date and time of the schedule 602, is blanked, and the deletion of the scheduled date and time of the contract code "1001" is noticed to "Distributor A".

In a step 1906, receiving the notice of deletion of the scheduled date and time for delivery from the distribution server, the column of the scheduled date and time of the corresponding purchased goods information is blanked as well as the related schedule is deleted. For example, when receiving the notice of deletion of delivery of the contract code "1001", the scheduled date "960925(16)" for delivery 704 in FIG. 7 is blanked, and the schedule information 602 which has the same date and time as 704 in the column of the starting date and time is deleted.

In a step 1907, receiving the notice from the client in the same manner as in the step 103 mentioned in the above, it is registered into the delivery goods information. However, sometimes the delivery information may be deleted by the step 1901 mentioned above during the execution of the steps 101 and 102. Therefore, it is registered into the delivery goods information after confirming the existence of the scheduled date and time in the delivery information.

In accordance with the present embodiment, when the purchaser deletes her/his schedule to receive the goods, it is automatically noticed to the distributor and a list of available date and time for delivery is transmitted from the distributor again. Therefore, the purchaser should not always be bound to the schedule for receiving the goods, and she/he can re-adjust the schedule easily. Further, if the distributor deletes the schedule for delivery, it is automatically noticed to the purchaser, and a list of available date and time for delivery is transmitted from the distributor again for the purchaser to ensure the schedule to receive it. Thereby, the distributor can reduce the influence on the purchaser as small as possible.

It is also possible to store the program for executing the procedures shown in FIGS. 1, 12 and 19 into a portable storage medium, such as a floppy disk or an optical disk, so as to be read into a main memory for execution thereof in a personal computer system, etc.

With the delivery managing system of the present invention fully explained in the above has following effects:

(1) Because the distributor can distribute the delivery goods after confirming that the stay of the receiver or addressee at home, therefore, the possibility or chance of delivery in absence of the receiver or addressee is reduced, thereby reducing the cost for delivery. (However, the delivery during absence of the resident cannot necessarily neglected to be zero because she/he sometimes goes out after making confirmation.)

(2) The purchaser can receive the purchased goods at an earlier timing at her/his home, by keeping her/himself for a moment from going outside for shopping, etc., since the date and time for delivery is clear for her/him in advance.

(3) In case that the purchaser does not come back home in the delivery time of the distributor for a several days, she/he can receive the goods in an earlier timing by using the agent (However, in this case the assumption is necessary that the agent is doing business later that the distributor. In case that the delivery locker is provided in the agent, since the dehumanization of the agent can be achieved, realization of the above assumption becomes easier.).

(4) On the goods which has been kept for a several days in the agent since the purchaser forgot to receive it, a reminder can be given from the distributor or the agent to the purchaser to receive it, thereby dissolving the forgetting to receive by the purchaser in an earlier timing. Further, the purchaser can check if she/he forgets to receive the goods by her/himself, thereby she/he may go to the distributor or the agent to receive or change the delivery address to her/his home address.

(5) When the purchaser deletes her/his schedule to receive the goods, it is automatically noticed to the distributor and a list of available date and time for delivery is transmitted from the distributor again. Therefore, the purchaser should not be always bound to the schedule for receiving the goods, and she/he can re-adjust the schedule easily.

(6) If the distributor deletes the schedule for delivery, it is automatically noticed to the purchaser, and a list of available date and time for delivery is transmitted from the distributor again, for the purchaser to ensure the schedule to receive. Thereby, the distributor can reduce an influence on the purchaser as small as possible.

What is claimed:

1. A delivery managing system for managing delivery of a delivery goods from a distribution center through an agent to a receiver;
    a client for providing at least a schedule information of the receiver;
    a distribution server for providing at least a delivery schedule information and for managing delivery of the delivery goods;
    an agent server for managing commission on the delivery goods by the agent;
    a data transmission network, through which said client, said agent server and said distribution server are connected to one another;
    means for determining date and time for delivery of the delivery goods and for deciding the agent to be used, between said client and said distribution server; and
    means for notifying of arrival and departure of the delivery goods to and from the agent to at least one of said distribution server and said client.

2. A delivery managing system as defined in claim 1, there is further provided means for managing information on the arrival and departure of the delivery goods to and from the agent and detecting abnormality of the delivery goods in at least one of said distribution server and said client.

3. A delivery managing system as defined in claim 1, wherein there is further provided means for outputting an delivery goods information, in at least one of said distribution server and said client, said distribution server includes means for notifying the delivery goods information to said agent server, and said agent server includes means for reading out the delivery goods information from said outputting means, and means for comparing the delivery goods information noticed from said distribution server with the delivery goods information read out by said reading out means.

4. A delivery managing system as defined in claim 1, wherein said client further comprises:
    means for compiling the schedule information;
    means for notifying deletion of the schedule information for receiving the delivery goods to said distribution server related thereto, responding the deletion thereof; and
    means for deleting the related schedule information responding to a notice of deletion of the delivery schedule information from said distribution server; wherein said distribution server further comprises:
    means for deleting the delivery schedule information of the delivery goods responding to the notice of deletion of the schedule information for receiving the delivery goods from said client.

5. A delivery managing system as defined in claim 1, wherein said distribution server further comprises:
    means for compiling the delivery schedule information; and
    means for notifying deletion of the delivery schedule information to all of said client relating the deletion thereof.

6. A delivery managing system as defined in claim 1, wherein said agent server further comprises:
    a delivery locker having a plurality of boxes into which the delivery goods can be stored, each box thereof comprises at least means for observing thereof; and
    means for deciding the arrival and departure of the delivery goods to and from said agent by using the observing means of said delivery locker.

7. A delivery managing system for managing delivery of a delivery goods from a distribution center through an agent to a receiver, comprising:
    a client for providing at least a schedule information of the receiver;
    a distribution server for providing at least a delivery schedule information and for managing delivery of the delivery goods;
    an agent server for managing commission on the delivery goods by the agent;
    a data transmission network, through which said client, said agent server and said distribution server are connected to one another;
    means for determining date and time for delivery of the delivery goods and for deciding the agent to be used, among said client, said distribution server and said agent server; and
    means for notifying of arrival and departure of the delivery goods to and from the agent to at least one of said distribution server and said client.

8. A delivery managing system for managing delivery of a delivery goods from a distribution center to a receiver, comprising:
    a client for providing at least a schedule information of the receiver;

a distribution server for providing at least a delivery schedule information and for managing delivery of the delivery goods;

a data transmission network, through which said client and said distribution server are connected to each other;

means for determining date and time for delivery of the delivery of goods between said client and said distribution server; and means for deciding an agent to be used between said client and said distribution server on the basis of a purchased goods information relating to said goods for said agent.

9. A delivery managing system for managing delivery of a delivery goods from a distribution center to a receiver, comprising:

a client for providing at least a schedule information of the receiver;

a distribution server for providing at least a delivery schedule information and for managing delivery of the delivery goods;

a data transmission network, through which said client and said distribution server are connected to each other; and means for determining date and time for delivery of the delivery goods between said client and said distribution server.

10. A delivery managing system for managing delivery of a delivery goods from a distribution center through an agent to a receiver, comprising:

a distribution server for providing at least a delivery schedule information and for managing delivery of the delivery goods;

an agent server for managing commission on the delivery goods by the agent;

a data transmission network, through which said distribution server and said agent server are connected to each other; and means for notifying of arrival and departure of the delivery goods to and from the agent, from said agent server to said distribution server or the receiver; and means for managing information on the arrival and departure of the delivery goods to and from the agent and detecting abnormality of the delivery goods, in said distribution server.

11. A delivery managing system for managing delivery of a delivery goods from a distribution center through an agent to a receiver, comprising:

a client for providing at least a schedule information of the receiver or an information of the agent to be used;

a distribution server for managing delivery of the delivery goods;

an agent server for managing commission on the delivery goods by the agent and having means for detecting arrival and departure of the delivery goods to and from the agent; and a data transmission network, through which said client, said agent server and said distribution server are connected to one another; wherein said distribution server comprises:

means for providing a delivery schedule information on delivery schedule and a delivery goods information on a content of the delivery goods and for notifying of a list of available delivery schedule information to said client on the basis of the delivery schedule information to said client on the basis of the delivery schedule information and the a delivery goods information;

means for setting date and time for delivery of the delivery goods or the agent to be used into the delivery schedule information responding to the schedule information and the information of the agent to be used which are notice from said client;

means for setting a condition of the arrival into the agent in the delivery goods information relating thereto, responding to a notice of the arrival of the delivery goods from said agent server;

means for setting a condition of the departure from the agent in the delivery goods information relating thereto, responding to a notice of the departure of the delivery goods from said agent server;

means for outputting the delivery goods information of the delivery goods to be delivered to the agent; and means for detecting the delivery goods information of the delivery goods in abnormal condition;

said client further comprises:

means for providing a schedule information and a purchased goods information into which the contents of the delivery goods and a criteria for use of the agent are described;

means for deciding to use the agent or not, on the basis of the list of the available delivery schedule information and the schedule information and the criteria for use of the agent of the purchased goods information from said distribution server, and for notifying of the date and time for delivery or the agent to be used to said distribution server, and for setting a receipt schedule of the delivery goods into the schedule information if it is decided not to use the agent;

means for setting the condition of the arrival into the agent in the purchased goods information of the delivery goods, responding to a notice of the arrival thereof from the agent server;

means for setting the condition of the departure from the agent in the purchased goods information of the delivery goods, responding to a notice of the departure thereof from the agent server;

means for outputting the purchased goods information of the delivery goods to be delivered to the agent server; and said agent server further comprises:

means for providing a commissioned goods information relating to the delivery goods which are transferred from the distribution center into the agent to be commissioned;

means for setting an information relating to the arrival of the delivery goods to be commissioned, into the commissioned goods information, and for notifying thereof to said distribution server and said client relating thereto, responding to input of the arrival of the delivery goods to be commissioned; and means for setting an information relating to the departure of the delivery goods to be commissioned, into the commissioned goods information, and for notifying thereof to said distribution server and said client relating thereto, responding to input of the departure of the delivery goods to be commissioned.

12. A delivery managing system as described in claim 11, wherein said agent server further comprises:

a delivery locker for common use, which comprises a plurality boxes, and box open/close devices and box observation devices for each box thereof;

means for providing the commissioned goods information relating to the delivery goods transferred from the distribution center, and a locker information having at least a size of each box and an identification number of the delivery goods stored therein;

means, in response to input of the information relating to the arrival of the delivery goods to be commissioned, for searching a box satisfying a condition for storing the delivery goods to be commissioned, means for instructing releasing of key to the open/close device of the box which is searched out;

means for instructing locking of the key of the open/close device when a door of the box is closed again; means for setting the arrival information to the commissioned goods information;

means for setting an identification code of the delivery goods to be commissioned into the locker information relating to the box into which the delivery goods is stored; and means for notifying of the arrival of the delivery goods to be commissioned to said distribution server and said client related thereto;

means, in response to input of the identification code of the delivery goods to be commissioned;

means for instructing releasing of the key to the box open/close device of the box which is coincident with the identification code;

means for instructing locking of the key to the box open/close device when the door of the box is closed again;

means for setting the departure of the delivery goods to be commissioned, into the locker information and the commissioned goods information; and means for notifying of the arrival of the delivery goods to be commissioned to said distribution server and said agent server related thereto.

13. A delivery managing system for managing delivery of a delivery goods from a distribution center through an agent to a receiver, comprising:

a client f or providing at least a requirement for receiving the delivery goods by the receiver;

a distribution server providing at least a delivery schedule information and for managing delivery of the delivery goods;

an agent server for managing commission on the delivery goods by the agent; and a data transmission network, through which said client, said agent server and said distribution server are connected to one another.

14. A delivery managing system for managing delivery of a delivery goods from a distribution center through a agent to a receiver, comprising:

a client for providing at least a requirement for receiving the delivery goods by the receiver;

a distribution server providing at least a delivery schedule information and for managing delivery of the delivery goods;

an agent server for managing commission on the delivery goods by the agent; and a data transmission network, through which said client, said agent server and said distribution server are connected to one another, wherein a conveyable memory medium is used for communicating between said client and said agent server, on which an information relating to the delivery and the receipt on the delivery goods is outputted.

15. A delivery managing system for managing delivery of a delivery goods from a distribution center through an agent to a receiver, comprising:

a client for providing at least an order for receiving the delivery goods by the receiver;

a distribution server providing at least a delivery schedule information and for managing delivery of the delivery goods;

an agent server for managing commission on the delivery goods by the agent; and a data transmission network, through which said client, said agent server and said distribution server are connected to one another, wherein said distribution server sends back an identification information corresponding to the order from said client to said client for certifying that an addressee of the delivery goods is to be said client when it is sent thereto, and outputs said identification number into a memory medium, which is attached onto said delivery goods.

16. A delivery managing system for managing delivery of a delivery goods from a distribution center through a agent to a receiver, comprising:

a client for providing at least an order for receiving the delivery goods by the receiver;

a distribution server providing at least a delivery schedule information and for managing delivery of the delivery goods;

an agent server for managing commission on the delivery goods by the agent; and a data transmission network, through which said client, said agent server and said distribution server are connected to one another, wherein said distribution server sends back an identification information corresponding to the order from said client to said client as well as to said agent server depending on the order from said client or a shape of the delivery goods, and said agent server checks said identification information read from said client into a memory medium with the identification information from said distribution server when the goods is delivered.

* * * * *